US012172353B2

(12) United States Patent
Sugita

(10) Patent No.: US 12,172,353 B2
(45) Date of Patent: *Dec. 24, 2024

(54) PLASTICIZING DEVICE, INJECTION MOLDING DEVICE, AND THREE-DIMENSIONAL SHAPING DEVICE

(71) Applicant: Seiko Epson Corporation, Tokyo (JP)

(72) Inventor: Atsuhiko Sugita, Suwa (JP)

(73) Assignee: SEIKO EPSON CORPORATION (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/832,994

(22) Filed: Jun. 6, 2022

(65) Prior Publication Data

US 2022/0388214 A1    Dec. 8, 2022

(30) Foreign Application Priority Data

Jun. 7, 2021    (JP) ................... 2021-094985

(51) Int. Cl.
*B29C 45/62*    (2006.01)
*B29C 45/23*    (2006.01)
(Continued)

(52) U.S. Cl.
CPC .............. *B29C 45/62* (2013.01); *B29C 45/23* (2013.01); *B29C 45/464* (2013.01);
(Continued)

(58) Field of Classification Search
CPC ....... B29C 45/62; B29C 45/464; B29C 48/68; B29C 48/6801; B29C 48/6803;
(Continued)

(56) References Cited

U.S. PATENT DOCUMENTS 2,567,147 A    9/1951   Cousino
2,705,342 A    4/1955   Hendry
(Continued)

FOREIGN PATENT DOCUMENTS

CN    102791460 A    11/2012
CN    102490309 B   * 11/2013   ............. B29C 45/53
(Continued)

OTHER PUBLICATIONS

Shen Kaizhi-Beijing Plastic Product Design Methods and Application Examples; published by National Defense Industry Press; ISBN 7-118-04661-2; Jan. 2007 (total 11 pages).

*Primary Examiner* — Seyed Masoud Malekzadeh
*Assistant Examiner* — Vipul Malik
(74) *Attorney, Agent, or Firm* — Harness, Dickey & Pierce, P.L.C.

(57) ABSTRACT

To provide a plasticizing device capable of easily executing maintenance of a barrel. A plasticizing device includes: a drive motor; a flat screw having a groove forming surface in which a groove is formed, and rotating around a rotation axis of the drive motor; a barrel having a facing surface facing the groove forming surface and having a communication hole formed therein; and a heating unit configured to heat a material supplied between the flat screw and the barrel. The barrel has a separate structure including, when viewed from a direction orthogonal to the rotation axis, a first barrel having the facing surface, and a second barrel separated from the facing surface.

15 Claims, 8 Drawing Sheets

(51) Int. Cl.
*B29C 45/46* (2006.01)
*B29C 45/50* (2006.01)
*B29C 45/60* (2006.01)
*B29C 45/74* (2006.01)
*B29C 64/209* (2017.01)
*B29C 64/314* (2017.01)
*B33Y 30/00* (2015.01)

(52) U.S. Cl.
CPC .......... *B29C 45/5008* (2013.01); *B29C 45/60* (2013.01); *B29C 45/74* (2013.01); *B29C 64/209* (2017.08); *B29C 64/314* (2017.08); *B33Y 30/00* (2014.12)

(58) Field of Classification Search
CPC ... B29C 48/681; B29C 64/209; B29C 64/314; B33Y 30/00; B33Y 40/00; B22F 12/53; B22F 12/50
See application file for complete search history.

(56) References Cited

U.S. PATENT DOCUMENTS

| | | | |
|---|---|---|---|
| 3,009,685 A | 11/1961 | Rettig | |
| 3,577,841 A | 5/1971 | Ledoux et al. | |
| 3,866,669 A | 2/1975 | Gardiner | |
| 3,944,191 A | 3/1976 | Kasamatsu | |
| 3,954,366 A | 5/1976 | Fields | |
| 4,272,466 A | 6/1981 | Harris | |
| 4,531,308 A | 7/1985 | Neilson et al. | |
| 4,649,262 A | 3/1987 | Yoshikawa | |
| 5,121,329 A | 6/1992 | Crump | |
| 6,033,205 A | 3/2000 | Chiu | |
| 6,146,575 A * | 11/2000 | Huston | F04C 13/002 425/270 |
| 7,846,369 B2 | 12/2010 | Akopyan | |
| 2003/0075833 A1 | 4/2003 | Thomson | |
| 2007/0063378 A1 | 3/2007 | O'Donoghue | |
| 2008/0213419 A1 | 9/2008 | Skubic et al. | |
| 2009/0208600 A1 | 8/2009 | Akamatsu | |
| 2011/0159139 A1 | 6/2011 | Galati et al. | |
| 2015/0051339 A1 | 2/2015 | Brunner et al. | |
| 2017/0008230 A1 | 1/2017 | Yuyama | |
| 2017/0210069 A1 | 7/2017 | Stubenruss | |
| 2017/0239868 A1 | 8/2017 | Strange et al. | |
| 2017/0291364 A1 | 10/2017 | Womer | |
| 2018/0236705 A1 | 8/2018 | Conrad | |
| 2018/0297258 A1 * | 10/2018 | Zhu | B29C 45/78 |
| 2018/0297259 A1 | 10/2018 | Chen et al. | |
| 2018/0311894 A1 | 11/2018 | Saito et al. | |
| 2019/0061243 A1 * | 2/2019 | Saito | B29C 64/35 |
| 2019/0168455 A1 | 6/2019 | Besim et al. | |
| 2019/0358903 A1 | 11/2019 | Watanabe et al. | |
| 2020/0094480 A1 * | 3/2020 | Yamasaki | B22F 12/53 |
| 2020/0139629 A1 | 5/2020 | Yokota | |
| 2020/0324337 A1 | 10/2020 | Lieberwirth et al. | |
| 2020/0338824 A1 | 10/2020 | Cardon et al. | |
| 2021/0031422 A1 | 2/2021 | Yamashita | |
| 2021/0031423 A1 | 2/2021 | Yamashita | |
| 2021/0031444 A1 | 2/2021 | Yamashita | |
| 2021/0162642 A1 | 6/2021 | Anegawa | |
| 2021/0370567 A1 | 12/2021 | Maruyama et al. | |

FOREIGN PATENT DOCUMENTS

| | | | |
|---|---|---|---|
| EP | 1733863 A1 | 12/2006 | |
| JP | S61-235120 A | 10/1986 | |
| JP | H09-070864 A | 3/1997 | |
| JP | 3052603 U | 9/1998 | |
| JP | H10-249892 A | 9/1998 | |
| JP | 2000-127214 A | 5/2000 | |
| JP | 2004-314399 A | 11/2004 | |
| JP | 2009-269182 A | 11/2009 | |
| JP | 2010000752 A * | 1/2010 | |
| JP | 2010-241016 A | 10/2010 | |
| JP | 2013-184387 A | 9/2013 | |
| JP | 2018-079652 A | 5/2018 | |
| JP | 2019-202458 A | 11/2019 | |
| JP | 2020-075397 A | 5/2020 | |
| WO | WO-2012120118 A1 * | 9/2012 | F01N 1/02 |
| WO | 2015/129733 A1 | 9/2015 | |

\* cited by examiner

PLASTICIZING DEVICE, INJECTION MOLDING DEVICE, AND THREE-DIMENSIONAL SHAPING DEVICE

The present application is based on, and claims priority from JP Application Serial Number 2021-094985, filed Jun. 7, 2021, the disclosure of which is hereby incorporated by reference herein in its entirety.

BACKGROUND

1. Technical Field

The present disclosure relates to a plasticizing device, an injection molding device, and a three-dimensional shaping device.

2. Related Art

An injection molding device is known in which a material plasticized by a plasticizing device is supplied to a cavity formed by a pair of molds and injected from a nozzle.

For example, JP-A-2010-241016 describes a plasticizing and delivering device provided with a barrel having a material inflow passage opened at one end surface, a rotor having an end surface that comes into sliding contact with the one end surface of the barrel, and a spiral groove formed in the end surface of the rotor.

In the plasticizing and delivering device as described above, it is difficult to clean the inside of the barrel, and when one end surface of the barrel facing the rotor is worn, the entire barrel needs to be replaced, and maintenance is difficult to be executed.

SUMMARY

One aspect of a plasticizing device according to the present disclosure includes: a drive motor; a flat screw having a groove forming surface in which a groove is formed, and rotating around a rotation axis of the drive motor; a barrel having a facing surface facing the groove forming surface and having a communication hole formed therein; and a heating unit configured to heat a material supplied between the flat screw and the barrel. The barrel has a separate structure including, when viewed from a direction orthogonal to the rotation axis, a first barrel having the facing surface, and a second barrel separated from the facing surface.

One aspect of an injection molding device according to the present disclosure includes: a plasticizing device configured to plasticize a material into a plasticized material; and a nozzle configured to inject the plasticized material supplied from the plasticizing device toward a molding mold. The plasticizing device includes: a drive motor; a flat screw having a groove forming surface in which a groove is formed, and rotating around a rotation axis of the drive motor; a barrel having a facing surface facing the groove forming surface and having a communication hole formed therein; and a heating unit configured to heat a material supplied between the flat screw and the barrel. The barrel has a separate structure including, when viewed from a direction orthogonal to the rotation axis, a first barrel having the facing surface, and a second barrel separated from the facing surface.

One aspect of a three-dimensional shaping device according to the present disclosure includes: a plasticizing device configured to plasticize a material into a plasticized material; and a nozzle configured to discharge the plasticized material supplied from the plasticizing device toward a stage. The plasticizing device includes: a drive motor; a flat screw having a groove forming surface in which a groove is formed, and rotating around a rotation axis of the drive motor; a barrel having a facing surface facing the groove forming surface and having a communication hole formed therein; and a heating unit configured to heat a material supplied between the flat screw and the barrel. The barrel has a separate structure including, when viewed from a direction orthogonal to the rotation axis, a first barrel having the facing surface, and a second barrel separated from the facing surface.

DESCRIPTION OF EXEMPLARY EMBODIMENTS

Hereinafter, preferred embodiments of the present disclosure will be described in detail with reference to the drawings. The embodiments to be described below do not unduly limit contents of the present disclosure described in the claims. Not all configurations to be described below are necessarily essential components of the present disclosure.

1. Injection Molding Device

1.1. Overall Configuration

Figure 1:
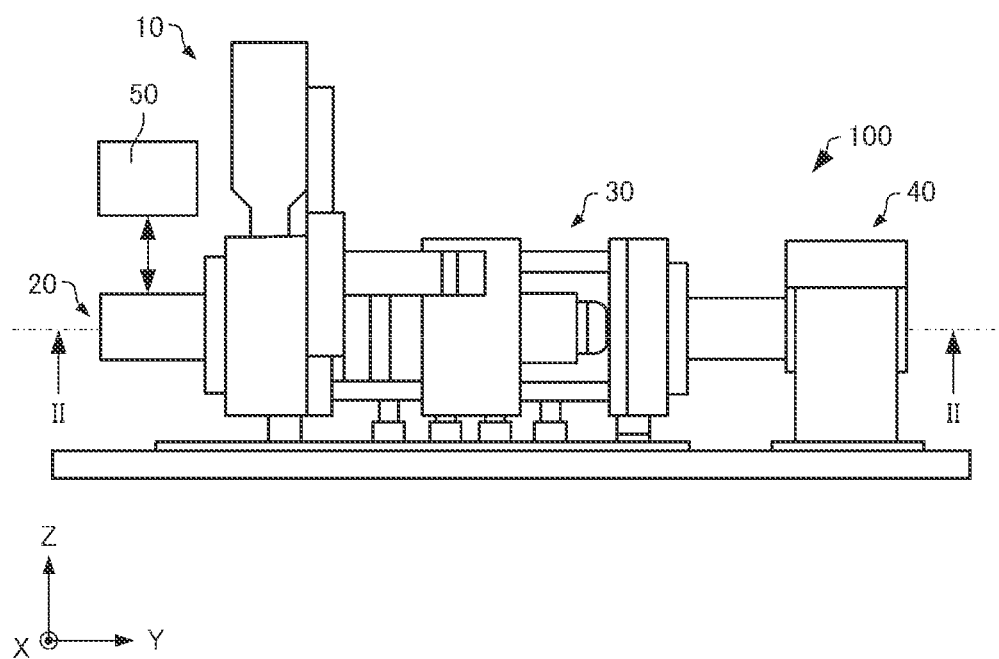
FIG. 1 is a diagram schematically illustrating an injection molding device according to a present embodiment.

First, an injection molding device according to the present embodiment will be described with reference to the drawings. FIG. 1 is a diagram schematically illustrating an injection molding device 100 according to the present embodiment. FIG. 1 illustrates an X axis, a Y axis, and a Z axis as three axes orthogonal to one another. An X-axis direction and a Y-axis direction are, for example, horizontal directions. A Z-axis direction is, for example, a vertical direction.

As illustrated in FIG. 1, the injection molding device 100 includes a material supply unit 10, an injection unit 20, a mold portion 30, a mold clamping unit 40, and a control unit 50.

The material supply unit 10 supplies a material serving as a raw material to the injection unit 20. The material supply unit 10 is formed by, for example, a hopper. A pellet-shaped or powder-shaped material is supplied to the material supply unit 10.

The injection unit 20 plasticizes the material supplied from the material supply unit 10 to obtain a plasticized material. The injection unit 20 injects the plasticized material toward the mold portion 30.

"Plasticize" is a concept including melting, and means changing from a solid state to a flowable state. Specifically, for a material in which glass transition occurs, the "plasticize" refers to setting a temperature of the material to be equal to or higher than a glass transition point. For a material in which glass transition does not occur, the "plasticize" refers to setting the temperature of the material to a temperature equal to or higher than a melting point.

A cavity corresponding to a shape of a molded product is formed in the mold portion 30. The plasticized material injected by the injection unit 20 flows into the cavity. Then, the plasticized material is cooled and solidified to produce the molded product.

The mold clamping unit 40 opens and closes the mold portion 30. The mold clamping unit 40 opens the mold portion 30 after the plasticized material is cooled and solidified. As a result, the molded product is discharged to the outside.

The control unit 50 is formed by, for example, a computer including a processor, a main storage device, and an input and output interface that inputs and outputs a signal from and to the outside. The control unit 50 exerts various functions by, for example, executing, by the processor, a program read into the main storage device. Specifically, the control unit 50 controls the injection unit 20 and the mold clamping unit 40. The control unit 50 may be formed by a combination of a plurality of circuits instead of the computer.

1.2. Specific Configuration

Figure 2:
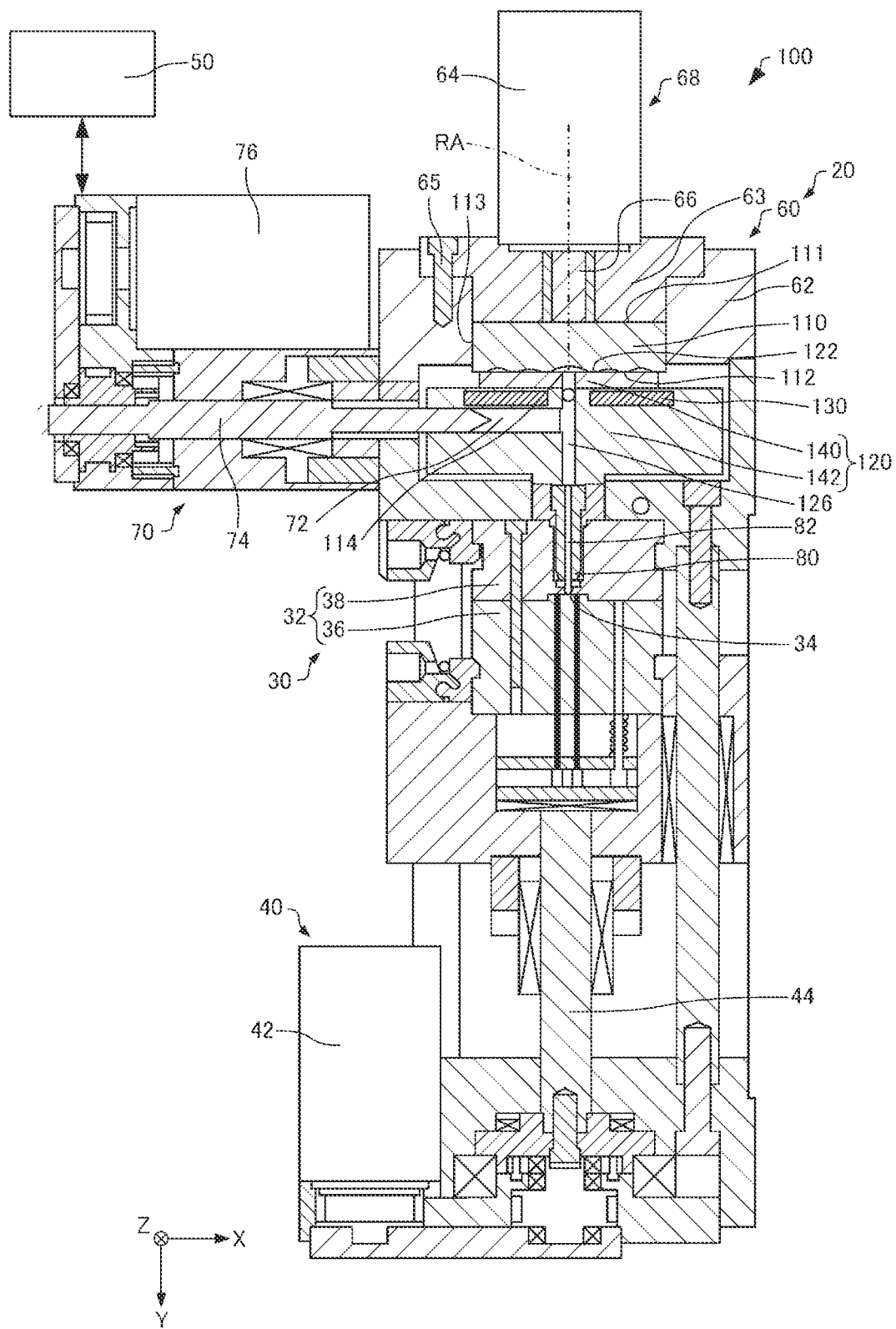
FIG. 2 is a cross-sectional view schematically illustrating the injection molding device according to the present embodiment.

FIG. 2 is a cross-sectional view taken along a line II-II of FIG. 1 schematically illustrating the injection molding device 100. As illustrated in FIG. 2, the injection unit 20 includes, for example, a plasticizing device 60, an injection mechanism 70, and a nozzle 80.

The plasticizing device 60 is formed to plasticize the material supplied from the material supply unit 10, produce a flowable plasticized material in a paste shape, and guide the plasticized material to the injection mechanism 70. The plasticizing device 60 includes, for example, a screw case 62, a drive motor 64, a flat screw 110, a barrel 120, and a heating unit 130.

The screw case 62 is a housing that accommodates the flat screw 110. The flat screw 110 is accommodated in a space surrounded by the screw case 62 and the barrel 120.

The drive motor 64 is provided in the screw case 62. The drive motor 64 rotates the flat screw 110. The drive motor 64 is, for example, a servomotor. A shaft 66 of the drive motor 64 is connected to the flat screw 110. The drive motor 64 is controlled by the control unit 50. Although not illustrated, the shaft 66 of the drive motor 64 and the flat screw 110 may be connected to each other via a reduction gear.

Figure 3:
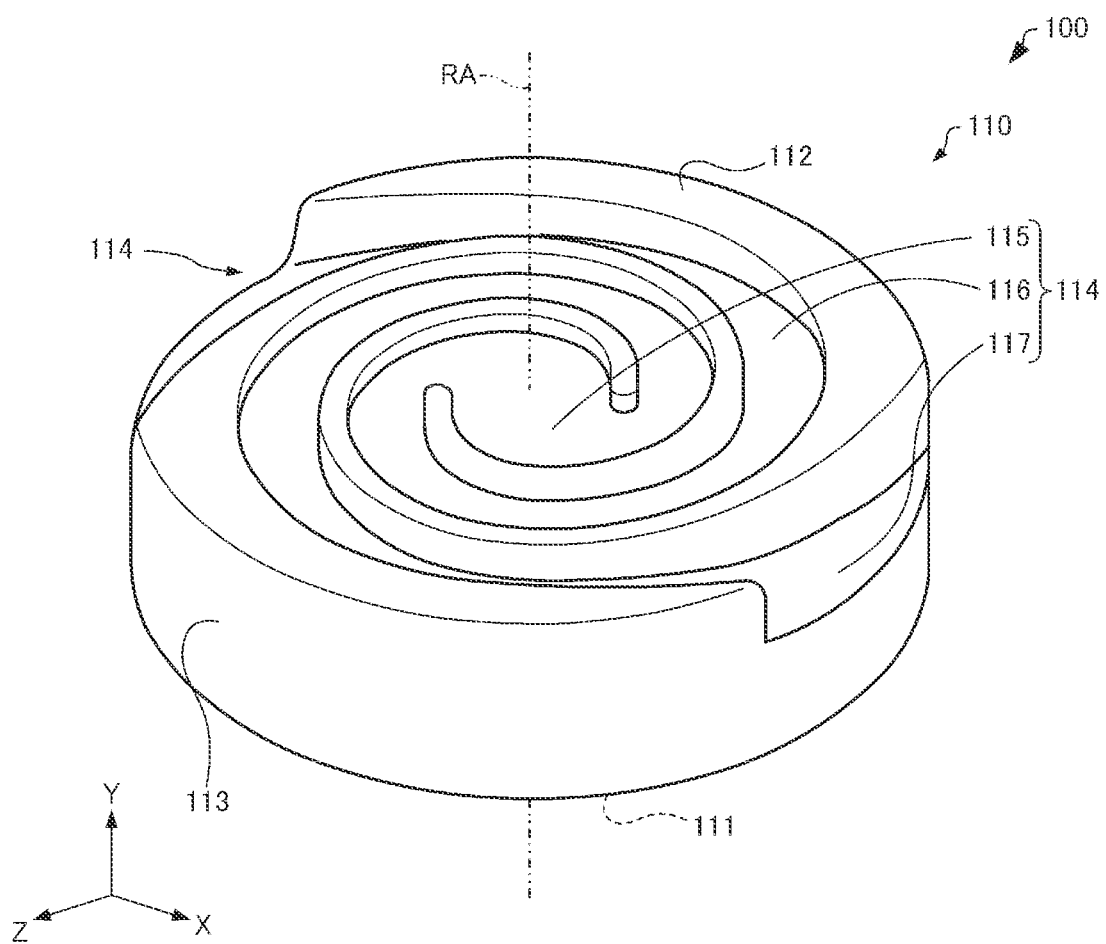
FIG. 3 is a perspective view schematically illustrating a flat screw of the injection molding device according to the present embodiment.

The flat screw 110 has a substantially cylindrical shape of which a size in a direction of a rotation axis RA is smaller than a size in a direction orthogonal to the direction of the rotation axis RA. In an illustrated example, the rotation axis RA is parallel to the Y axis. The flat screw 110 rotates about the rotation axis RA by a torque generated by the drive motor 64. The flat screw 110 has a main surface 111, a groove forming surface 112 opposite to the main surface 111, and a connection surface 113 connecting the main surface 111 to the groove forming surface 112. Here, FIG. 3 is a perspective view schematically illustrating the flat screw 110. For convenience, FIG. 3 illustrates a state where a vertical positional relationship is reversed from a state illustrated in FIG. 2.

As illustrated in FIG. 3, first grooves 114 are formed in the groove forming surface 112 of the flat screw 110. The first grooves 114 include, for example, a central portion 115, a connection unit 116, and a material introduction unit 117. The central portion 115 faces a communication hole 126 formed in the barrel 120. The central portion 115 communicates with the communication hole 126. The connection unit 116 connects the central portion 115 to the material introduction unit 117. In the illustrated example, the connection unit 116 is formed in a spiral shape from the central portion 115 toward an outer periphery of the groove forming surface 112. The material introduction unit 117 is formed on the outer periphery of the groove forming surface 112. That is, the material introduction unit 117 is formed on the connection surface 113 of the flat screw 110. The material supplied from the material supply unit 10 is introduced from the material introduction unit 117 into the first grooves 114, passes through the connection unit 116 and the central portion 115, and is conveyed to the communication hole 126 formed in the barrel 120. In the illustrated example, two first grooves 114 are formed.

The number of the first groove 114 is not particularly limited. Although not illustrated, three or more first grooves 114 may be formed, or only one first groove 114 may be formed.

As illustrated in FIG. 2, the barrel 120 is provided to face the flat screw 110. The barrel 120 has a facing surface 122 facing the groove forming surface 112 of the flat screw 110. A communication hole 126 is formed at the center of the facing surface 122. Here, FIG. 4 is a view schematically illustrating the barrel 120.

Figure 4:
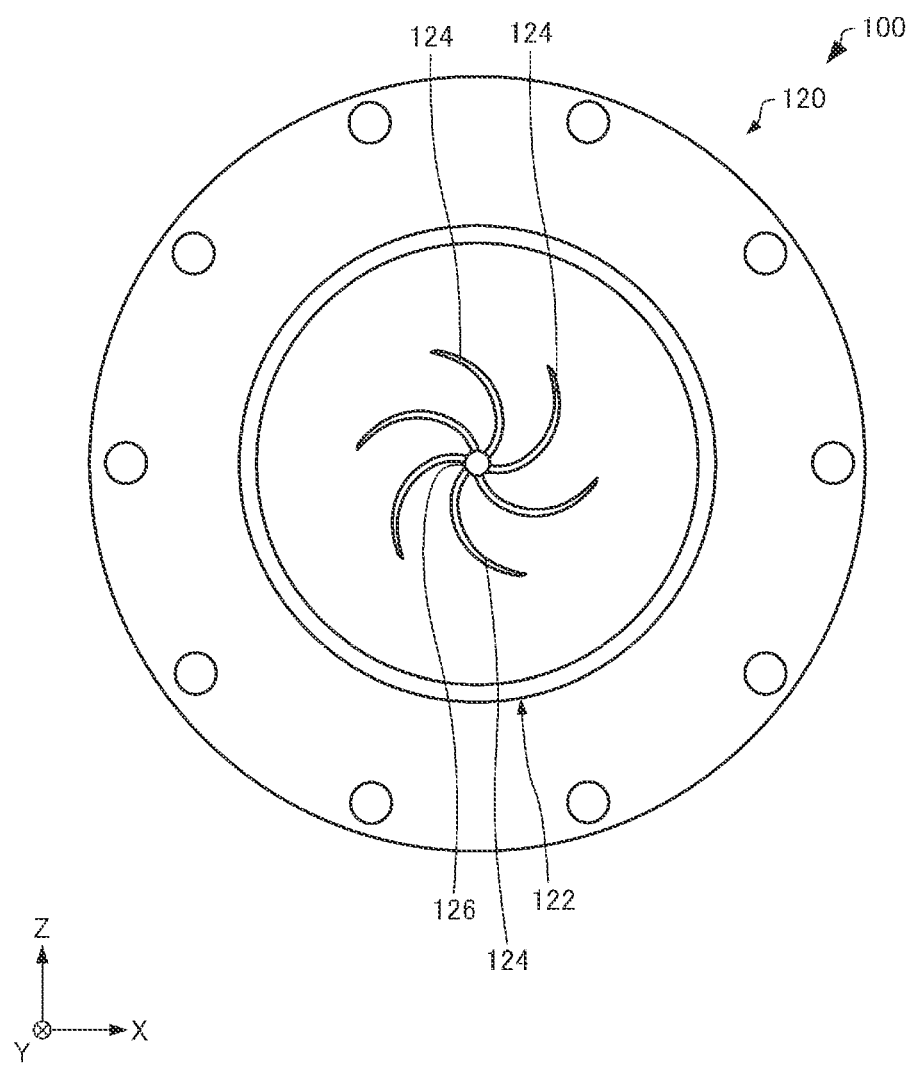
FIG. 4 is a view schematically illustrating a barrel of the injection molding device according to the present embodiment.

As illustrated in FIG. 4, second grooves 124 and the communication hole 126 are formed in the facing surface 122 of the barrel 120. The plurality of second grooves 124 are formed. In the illustrated example, six second grooves 124 are formed, but the number of the second grooves 124 is not particularly limited. The plurality of second grooves 124 are formed around the communication hole 126 when viewed from the Y-axis direction. The second groove 124 has one end connected to the communication hole 126, and extends spirally from the communication hole 126 toward an outer periphery of the facing surface 122. The second groove 124 has a function of guiding the plasticized material to the communication hole 126.

A shape of the second groove 124 is not particularly limited, and may be, for example, a linear shape. The one end of the second groove 124 may not be connected to the communication hole 126. Further, the second groove 124 may not be formed in the facing surface 122. However, in consideration of efficiently guiding the plasticized material to the communication hole 126, the second groove 124 may be formed in the facing surface 122.

As illustrated in FIG. 2, the heating unit 130 is provided in the barrel 120. The heating unit 130 heats the material supplied between the flat screw 110 and the barrel 120. Output of the heating unit 130 is controlled by the control unit 50. The plasticizing device 60 produces the plasticized material by heating a material by the heating unit 130 while conveying the material toward the communication hole 126 by the flat screw 110 and the barrel 120, and causes the produced plasticized material to flow out from the communication hole 126 to the injection mechanism 70.

The injection mechanism 70 includes, for example, a cylinder 72, a plunger 74, and a plunger driving unit 76. The cylinder 72 is a substantially cylindrical member connected to the communication hole 126. The plunger 74 moves inside the cylinder 72. The plunger 74 is driven by the plunger driving unit 76 formed by a motor, a gear, and the like. The plunger driving unit 76 is controlled by the control unit 50.

The injection mechanism 70 executes a metering operation and an injection operation by sliding the plunger 74 in the cylinder 72. The metering operation refers to an operation of guiding the plasticized material positioned in the communication hole 126 into the cylinder 72 and metering the plasticized material in the cylinder 72 by moving the plunger 74 in the −X-axis direction away from the communication hole 126. The injection operation refers to an operation of injecting the plasticized material in the cylinder 72 into the mold portion 30 through the nozzle 80 by moving the plunger 74 in the +X-axis direction approaching the communication hole 126.

A nozzle hole 82 communicating with the communication hole 126 is formed in the nozzle 80. The nozzle 80 injects the plasticized material supplied from the plasticizing device 60 toward a molding mold 32 of the mold portion 30. Specifically, the plasticized material metered in the cylinder 72 is sent from the injection mechanism 70 to the nozzle hole 82 through the communication hole 126 by executing the metering operation and the injection operation described above. The plasticized material is injected from the nozzle hole 82 into the mold portion 30.

The mold portion 30 includes the molding mold 32. The molding mold 32 is a mold. The plasticized material sent to the nozzle hole 82 is injected from the nozzle hole 82 into the cavity 34 of the molding mold 32. Specifically, the molding mold 32 includes a movable mold 36 and a fixed mold 38 facing each other, and includes a cavity 34 between the movable mold 36 and the fixed mold 38. The cavity 34 is a space corresponding to the shape of the molded product. The movable mold 36 and the fixed mold 38 are made of metal. The movable mold 36 and the fixed mold 38 may be made of ceramic or a resin.

The mold clamping unit 40 includes, for example, a mold driving unit 42 and a ball screw unit 44. The mold driving unit 42 is formed by, for example, a motor, a gear, and the like. The mold driving unit 42 is connected to the movable mold 36 via the ball screw unit 44. Driving of the mold driving unit 42 is controlled by the control unit 50. The ball screw unit 44 transmits power generated by the driving of the mold driving unit 42 to the movable mold 36. The mold clamping unit 40 opens and closes the mold portion 30 by moving the movable mold 36 by the mold driving unit 42 and the ball screw unit 44.

1.3. First Barrel and Second Barrel

Figure 5:
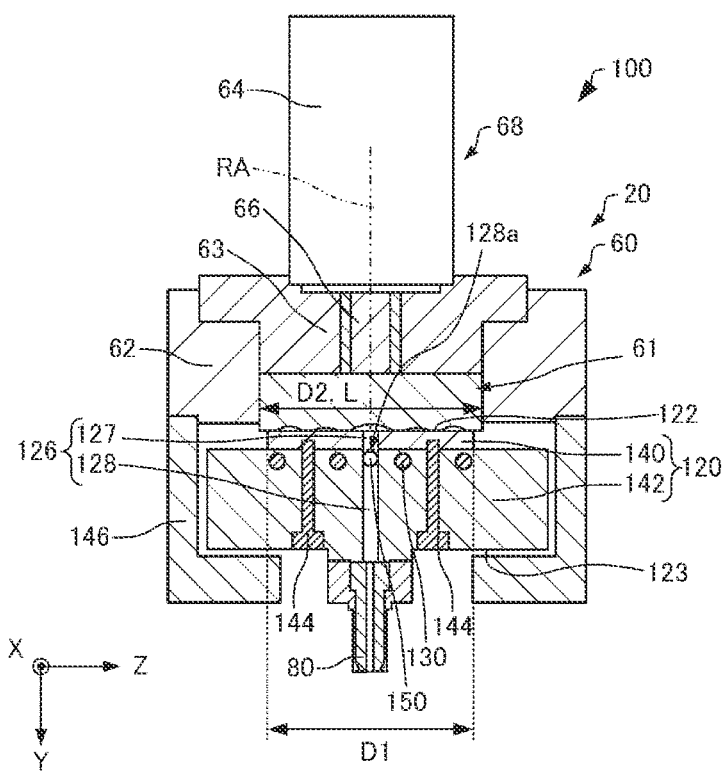
FIG. 5 is a cross-sectional view schematically illustrating the injection molding device according to the present embodiment.
Figure 6:
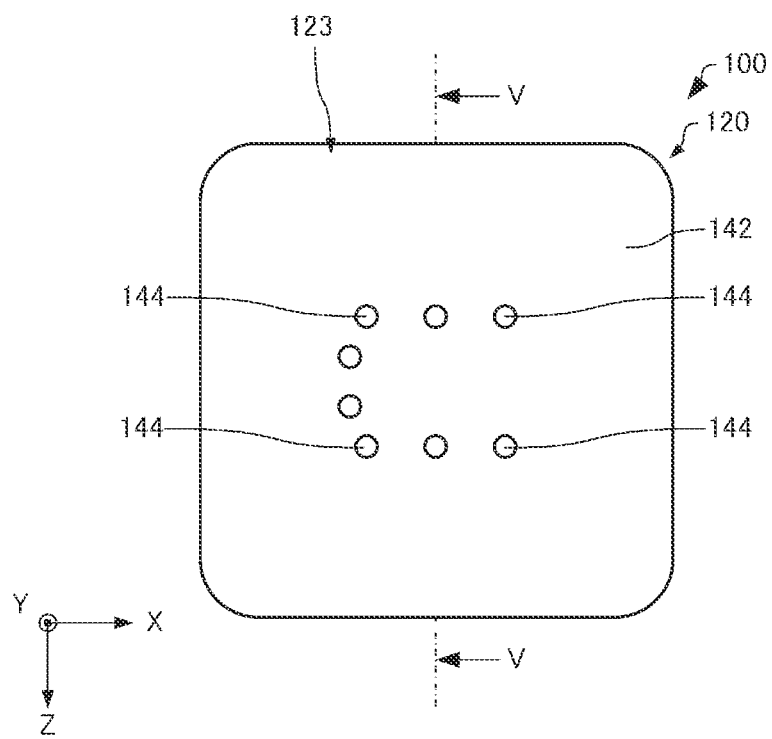
FIG. 6 is a view schematically illustrating a barrel of the injection molding device according to the present embodiment.

FIG. 5 is a cross-sectional view schematically illustrating the injection molding device 100. FIG. 6 is a view schematically illustrating the barrel 120 of the injection molding device 100. For convenience, illustration of components other than the injection unit 20 is omitted in FIG. 5. FIG. 5 is a cross-sectional view taken along a line V-V illustrated in FIG. 6. FIG. 5 illustrates a cross section orthogonal to the cross section illustrated in FIG. 2. Specifically, FIG. 2 illustrates the cross section including the X axis and the Y axis, and FIG. 5 illustrates the cross section including the Y axis and the Z axis. FIG. 6 is a view seen from an opposite surface 123 side opposite to the facing surface 122 of the barrel 120.

As illustrated in FIG. 5, the barrel 120 has a separate structure including a first barrel 140 and a second barrel 142 when viewed from a direction orthogonal to the rotation axis RA. That is, the first barrel 140 and the second barrel 142 are different members that are separated from each other. The first barrel 140 and the second barrel 142 are separable from each other. The communication hole 126 includes a first portion 127 formed in the first barrel 140 and a second portion 128 formed in the second barrel 142.

The first barrel 140 is provided between the flat screw 110 and the second barrel 142. The first barrel 140 may be separated from or in contact with the flat screw 110. The first barrel 140 is provided with the facing surface 122.

Shapes of the first barrel 140 and the flat screw 110 are, for example, a circular shape when viewed from the direction of the rotation axis RA. The shapes of the first barrel 140 and the flat screw 110 are, for example, a disk shape. When viewed from the direction along the rotation axis RA, a diameter D1 of the first barrel 140 is smaller than, for example, a diameter D2 of the flat screw 110. When viewed from the direction along the rotation axis RA, the diameter D1 of the first barrel 140 is, for example, smaller than a minimum length L of an opening portion 61 formed in the screw case 62. The opening portion 61 accommodates the flat screw 110. In the illustrated example, the minimum length L of the opening portion 61 is the same as that of the diameter D2.

When viewed from the direction of the rotation axis RA, the "minimum length L of the opening portion 61" is a diameter when a shape of the opening portion 61 is a circle, and is a diameter of a smallest enclosing circle when the shape of the opening portion 61 is not a circle. For example, when viewed from the direction of the rotation axis RA, the minimum length L of the opening portion 61 is, when the opening portion 61 is a polygon, a diameter of a minimum circle including the polygon inside, and is, when the opening portion 61 is an ellipse, a diameter of a minimum circle including the ellipse inside.

The second barrel 142 is provided between the first barrel 140 and the nozzle 80. The second barrel 142 is separated from the facing surface 122. The second barrel 142 is provided with the opposite surface 123. The nozzle 80 is connected to the second barrel 142. When viewed from the direction of the rotation axis RA, an area of the second barrel 142 is larger than an area of the first barrel 140 and an area of the flat screw 110.

The second barrel 142 is joined to the first barrel 140 by screws 144. A screw head of the screw 144 is exposed on the opposite surface 123. In the example illustrated in FIG. 6, eight screws 144 are provided, but the number of the screws 144 is not particularly limited.

As a first method of separating the first barrel 140 and the second barrel 142, first, a screw unit 68 is removed from the screw case 62 by loosening the screw 65 illustrated in FIG. 2. The screw unit 68 includes the drive motor 64, the flat screw 110, and a spacer 63 provided between the drive motor 64 and the flat screw 110. The screw 65 is provided in the spacer 63. Next, the screws 144 are loosened, the first barrel 140 is removed from the second barrel 142, and the first barrel 140 and the second barrel 142 are separated from each other. The first barrel 140 is removed from the second barrel 142 through the opening portion 61.

As a second method of separating the first barrel 140 from the second barrel 142, first, a barrel case 146 accommodating the barrel 120 is removed from the screw case 62. Next, the screws 144 are loosened to remove the second barrel 142 from the first barrel 140, thereby separating the first barrel 140 from the second barrel 142.

The first barrel 140 and the second barrel 142 are made of different materials, for example. The first barrel 140 is made of, for example, a material having a hardness higher than that of the second barrel 142. Accordingly, wear of the first barrel 140 due to a material to be supplied can be avoided. The second barrel 142 is made of, for example, a material cheaper than that of the first barrel 140. Accordingly, the barrel 120 can be manufactured at a low cost. The first barrel 140 is made of, for example, a material obtained by subjecting steel use stainless (SUS) to surface coating with boron nitride, and the second barrel 142 is made of, for example, SUS not subjected to the surface coating. Accordingly, the barrel 120 can be manufactured at a low cost, and wear of the first barrel 140 due to the material to be supplied can be avoided. The first barrel 140 is made of, for example, a material having a thermal conductivity higher than that of the second barrel 142. Accordingly, heat generated by the heating unit 130 can be efficiently transmitted to the material to be supplied. SUS forming the first barrel 140 and the second barrel 142 may be SUS440c which is martensitic stainless steel.

The second barrel 142 is provided with the heating unit 130. The first barrel 140 is not provided with the heating unit 130. In the example illustrated in FIG. 5, the heating unit 130 is formed by four rod heaters.

Although not illustrated, the second barrel 142 may be provided with a temperature sensor for detecting a temperature of the barrel 120, a cooling unit for cooling the material supplied between the flat screw 110 and the barrel 120, or a pressure sensor for detecting a pressure of the communication hole 126.

1.4. Check Valve

As illustrated in FIG. 5, the plasticizing device 60 further includes a check valve 150. The check valve 150 is provided in the second portion 128 of the communication hole 126. Specifically, the check valve 150 is provided at an end portion 128a of the second portion 128 on the first portion 127 side. In the illustrated example, the end portion 128a is an end portion of the second portion 128 in the −Y-axis direction. The check valve 150 can prevent backflow of the plasticized material from the communication hole 126 to the first grooves 114 formed in the flat screw 110. Here, FIG. 7 is a view schematically illustrating the check valve 150, and is a view of the communication hole 126 as viewed from the second barrel 142 side.

Figure 7:
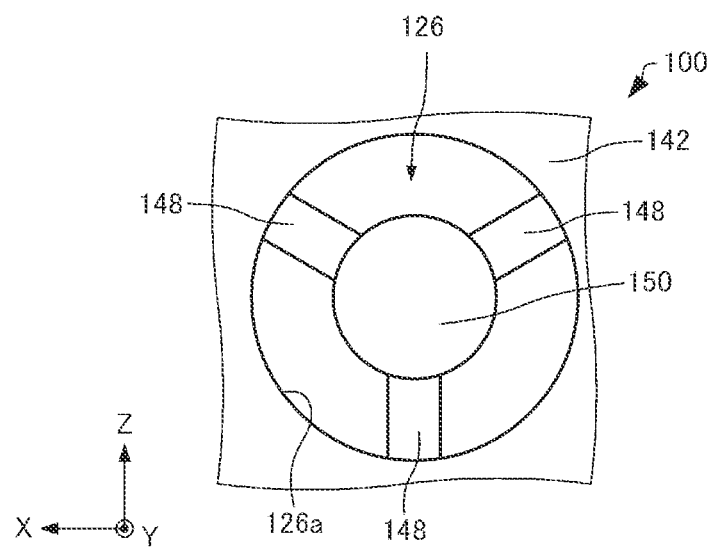
FIG. 7 is a view schematically illustrating a check valve of the injection molding device according to the present embodiment.

As illustrated in FIG. 7, the shape of the check valve 150 is spherical. In the illustrated example, the second barrel 142 includes three beams 148 provided on an inner surface 126a of the communication hole 126. The inner surface 126a is a surface of the barrel 120 defining the communication hole 126. As illustrated in FIG. 2, the cylinder 72 is connected to the second portion 128 of the communication hole 126. In a state where the injection mechanism 70 is executing the metering operation, the check valve 150 is separated from the three beams 148, and a check effect is not exhibited. When the injection mechanism 70 executes the injection operation, the check valve 150 comes into contact with the three beams 148 by a pressure generated by movement of the plunger 74 in the +X-axis direction, and prevents the backflow of the plasticized material to the first grooves 114.

1.5. Function and Effect

In the plasticizing device 60, the barrel 120 has a separate structure including the first barrel 140 having the facing surface 122 and the second barrel 142 separated from the facing surface 122 when viewed from the direction orthogonal to the rotation axis RA. Therefore, in the plasticizing device 60, the first barrel 140 and the second barrel 142 can be separated from each other, and the communication hole 126 can be easily cleaned. As a result, for example, a material remaining in the communication hole 126 can be reduced, and injection stability is high even when a highly elastic resin such as an elastomer is used as the material. Further, even if the facing surface 122 of the barrel 120 is worn by the material to be supplied, only the first barrel 140 may be replaced without replacing the entire barrel 120. Therefore, in the plasticizing device 60, maintenance of the barrel 120 can be easily executed. In particular, when the material to be plasticized contains a metal, the facing surface 122 is likely to be worn.

The plasticizing device 60 includes the screw case 62 in which the opening portion 61 accommodating the flat screw 110 is formed, and the diameter D1 of the first barrel 140 is smaller than the minimum length L of the opening portion 61 when viewed from the direction along the rotation axis RA. Therefore, in the plasticizing device 60, the first barrel 140 can be removed from the second barrel 142 through the opening portion 61.

In the plasticizing device 60, the diameter D1 of the first barrel 140 is smaller than the diameter D2 of the flat screw 110 when viewed from the direction along the rotation axis RA. Therefore, in the plasticizing device 60, the first barrel 140 can be removed from the second barrel 142 through the opening portion 61.

The plasticizing device 60 includes the check valve 150 provided in the communication hole 126, the communication hole 126 includes the first portion 127 formed in the first barrel 140 and the second portion 128 formed in the second barrel 142, and the check valve 150 is provided in the end portion 128a of the second portion 128 on the first portion 127 side. Therefore, in the plasticizing device 60, the check valve 150 can be easily cleaned by separating the first barrel 140 from the second barrel 142. Further, the check valve 150 can be easily replaced.

In the plasticizing device 60, the first barrel 140 and the second barrel 142 are made of different materials. Therefore, in the plasticizing device 60, for example, the first barrel 140 that is easily worn by the material to be supplied can be made of a material having higher hardness than that of the second barrel 142, and the second barrel 142 can be made of a material that is cheaper than that of the first barrel.

Therefore, the plasticizing device 60 can include an inexpensive barrel 120 while reducing the wear of the facing surface 122.

In the plasticizing device 60, the heating unit 130 is provided in the second barrel 142. Therefore, in the plasticizing device 60, when the first barrel 140 is worn by the material to be supplied, even when the first barrel 140 is replaced, the heating unit 130 is not replaced, and thus the cost can be reduced.

1.6. Material to be Supplied

Examples of the material to be supplied from the material supply unit 10 include materials having various materials such as a thermoplastic material, a metal material, and a ceramic material as main materials. Here, a "main material" means a material serving as a core material forming the shape of the molded product, and means a material having a content of 50% by mass or more in the molded product. The above-described materials include a material obtained by melting the main material alone, or a material obtained by melting the main material and a part of components contained in the main material into a paste shape.

For example, a thermoplastic resin can be used as the thermoplastic material. Examples of the thermoplastic resin include: general-purpose engineering plastics such as an acrylonitrile butadiene styrene (ABS) resin, polypropylene (PP), polyethylene (PE), polyacetal (POM), polyvinyl chloride (PVC), polyamide (PA), polylactic acid (PLA), polyphenylene sulfide (PPS), polycarbonate (PC), modified polyphenylene ether, polybutylene terephthalate, and polyethylene terephthalate; and engineering plastics such as polysulfone, polyether sulfone, polyphenylene sulfide, polyarylate, polyimide, polyamideimide, polyetherimide, and polyether ether ketone (PEEK).

Additives such as a pigment, a metal, ceramic, and other additives such as a wax, a flame retardant, an antioxidant, and a heat stabilizer may be mixed into the thermoplastic material. In the plasticizing device 60, the thermoplastic material is plasticized and converted into a molten state by rotation of the flat screw 110 and heating of the heating unit 130. The plasticized material produced in this manner is injected from the nozzle 80 and then cured due to a decrease in temperature. The thermoplastic material should be injected from the nozzle 80 in a state of being heated to a temperature equal to or higher than the glass transition point thereof and completely melted.

In the plasticizing device 60, for example, a metal material may be used as the main material instead of the above-described thermoplastic material. In this case, a powder material obtained by powdering the metal material should be mixed with a component that melts when the plasticized material is produced, and the mixture is input to the plasticizing device 60.

Examples of the metal material include a single metal such as magnesium (Mg), iron (Fe), cobalt (Co), chromium (Cr), aluminum (Al), titanium (Ti), copper (Cu), and nickel (Ni), or an alloy containing one or more of these metals, maraging steel, stainless steel, cobalt chromium molybdenum, a titanium alloy, a nickel alloy, an aluminum alloy, a cobalt alloy, and a cobalt chromium alloy.

In the plasticizing device 60, a ceramic material can be used as the main material instead of the above-described metal materials. Examples of the ceramic material include an oxide ceramic such as silicon dioxide, titanium dioxide, aluminum oxide, and zirconium oxide, and a non-oxide ceramic such as aluminum nitride.

The powder material of the metal material or the ceramic material supplied from the material supply unit 10 may be a mixed material obtained by mixing a plurality of types of powder of the single metal, powder of the alloy, or powder of the ceramic material. The powder material of the metal material or the ceramic material may be coated with, for example, the above-described thermoplastic resin or a thermoplastic resin other than the above-described thermoplastic resin. In this case, in the plasticizing device 60, the thermoplastic resin may be melted to exhibit fluidity.

For example, a solvent may be added to the powder material of the metal material or the ceramic material to be supplied from the material supply unit 10. Examples of the solvent include, for example, water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetate (for example, tetrabutylammonium acetate); and ionic liquids such as butyl carbitol acetate.

In addition, for example, a binder may be added to the powder material of the metal material or the ceramic material supplied from the material supply unit 10. Examples of the binder include an acrylic resin, an epoxy resin, a silicone resin, a cellulose-based resin, other synthetic resins, PLA, PA, PPS, PEEK, and other thermoplastic resins.

2. Modifications of Injection Molding Device

2.1. First Modification

Figure 8:
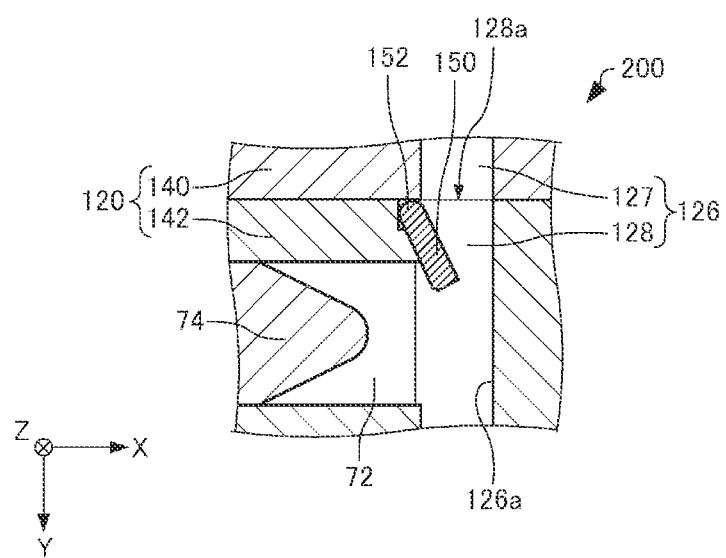
FIG. 8 is a cross-sectional view schematically illustrating an injection molding device according to a first modification of the present embodiment.
Figure 9:
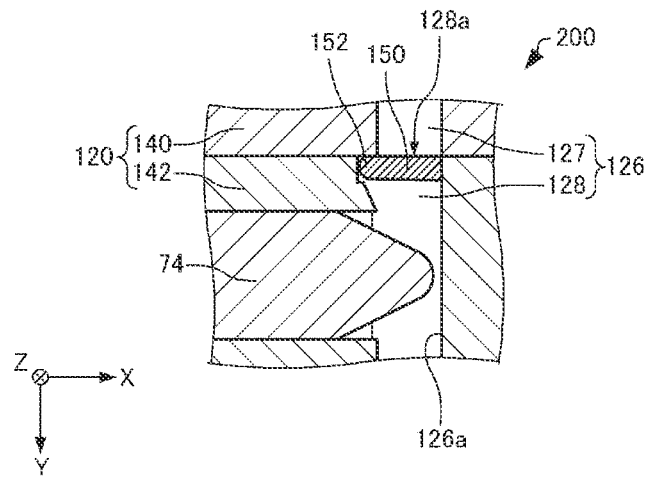
FIG. 9 is a cross-sectional view schematically illustrating the injection molding device according to the first modification of the present embodiment.

Next, an injection molding device according to a first modification of the present embodiment will be described with reference to the drawings. FIGS. 8 and 9 are cross-sectional views schematically illustrating an injection molding device 200 according to the first modification of the present embodiment.

Hereinafter, in the injection molding device 200 according to the first modification of the present embodiment, members having the same functions as those of constituent members of the injection molding device 100 according to the present embodiment described above are denoted by the same reference numerals, and detailed description thereof will be omitted. The same applies to an injection molding device according to a second modification of the present embodiment to be described below.

In the injection molding device 100 described above, as illustrated in FIG. 7, the shape of the check valve 150 is spherical.

On the other hand, as illustrated in FIGS. 8 and 9, in the injection molding device 200, the check valve 150 is a flap valve that swings about a connection portion 152 connected to the inner surface 126a of the communication hole 126 as a fulcrum. The inner surface 126a is a surface of the second barrel 142 defining the communication hole 126. In the illustrated example, the check valve 150 has a rod shape, and an end opposite to the connection portion 152 is a free end.

In a state where the injection mechanism 70 is executing the metering operation, as illustrated in FIG. 8, the check valve 150 is in an open state, and the check effect is not exhibited. When the injection mechanism 70 executes the injection operation, as illustrated in FIG. 9, the check valve 150 is brought into a closed state by the pressure generated by the movement of the plunger 74 in the +X-axis direction, and the check valve 150 prevents the backflow of the plasticized material to the first grooves 114 formed in the flat screw 110.

In the injection molding device 200, as illustrated in FIG. 7, it is unnecessary to provide the beams 148 in the communication hole 126. Accordingly, since the plasticized material is not divided by the beams 148, even when a material having high flow resistance is used, a decrease in an injection amount can be prevented. In the injection molding device 200, since the first barrel 140 and the second barrel 142 can be separated from each other, the check valve 150, which is a flap valve, can be easily provided at the end portion 128a of the second portion 128 of the communication hole 126.

2.2. Second Modification

Figure 10:
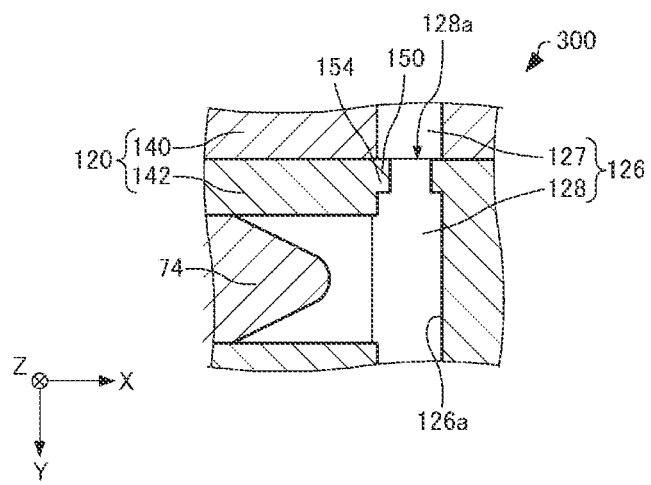
FIG. 10 is a cross-sectional view schematically illustrating an injection molding device according to a second modification of the present embodiment.
Figure 11:
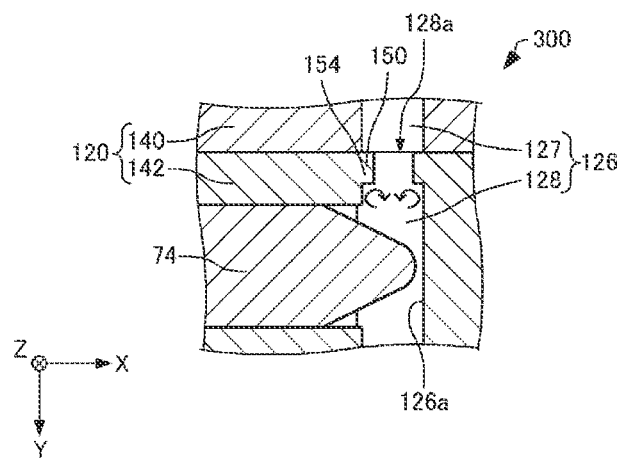
FIG. 11 is a cross-sectional view schematically illustrating the injection molding device according to the second modification of the present embodiment.

Next, the injection molding device according to the second modification of the present embodiment will be described with reference to the drawings. FIGS. 10 and 11 are cross-sectional views schematically illustrating an injection molding device 300 according to the second modification of the present embodiment.

In the injection molding device 100 described above, as illustrated in FIG. 6, the shape of the check valve 150 is spherical.

On the other hand, in the injection molding device 300, as illustrated in FIGS. 10 and 11, the check valve 150 is a Tesla valve using a step 154 provided on the inner surface 126a of the communication hole 126. The inner surface 126a is a surface of the second barrel 142 defining the communication hole 126. When viewed from the Y-axis direction, the step 154 has a ring shape. A diameter of the communication hole 126 at a portion where the step 154 is provided is smaller than a diameter of the communication hole 126 at a portion where the step 154 is not provided.

In a state where the injection mechanism 70 is executing the metering operation, as illustrated in FIG. 10, retention of the plasticized material due to the step 154 does not occur, and the check effect of the check valve 150 is not exhibited. When the injection mechanism 70 executes the injection operation, as illustrated in FIG. 11, the plasticized material is retained due to the step 154 and the plunger 74 as indicated by arrows illustrated in FIG. 11. As a result, the check valve 150 prevents the backflow of the plasticized material to the first grooves 114 formed in the flat screw 110.

In the injection molding device 300, similarly to the injection molding device 200, since the plasticized material is not divided by the beams 148, even when a material having high flow resistance is used, the decrease in the injection amount can be prevented. In the injection molding device 300, since the first barrel 140 and the second barrel 142 can be separated from each other, the check valve 150, which is a Tesla valve, can be easily provided at the end portion 128a of the second portion 128 of the communication hole 126.

3. Three-Dimensional Shaping Device

Figure 12:
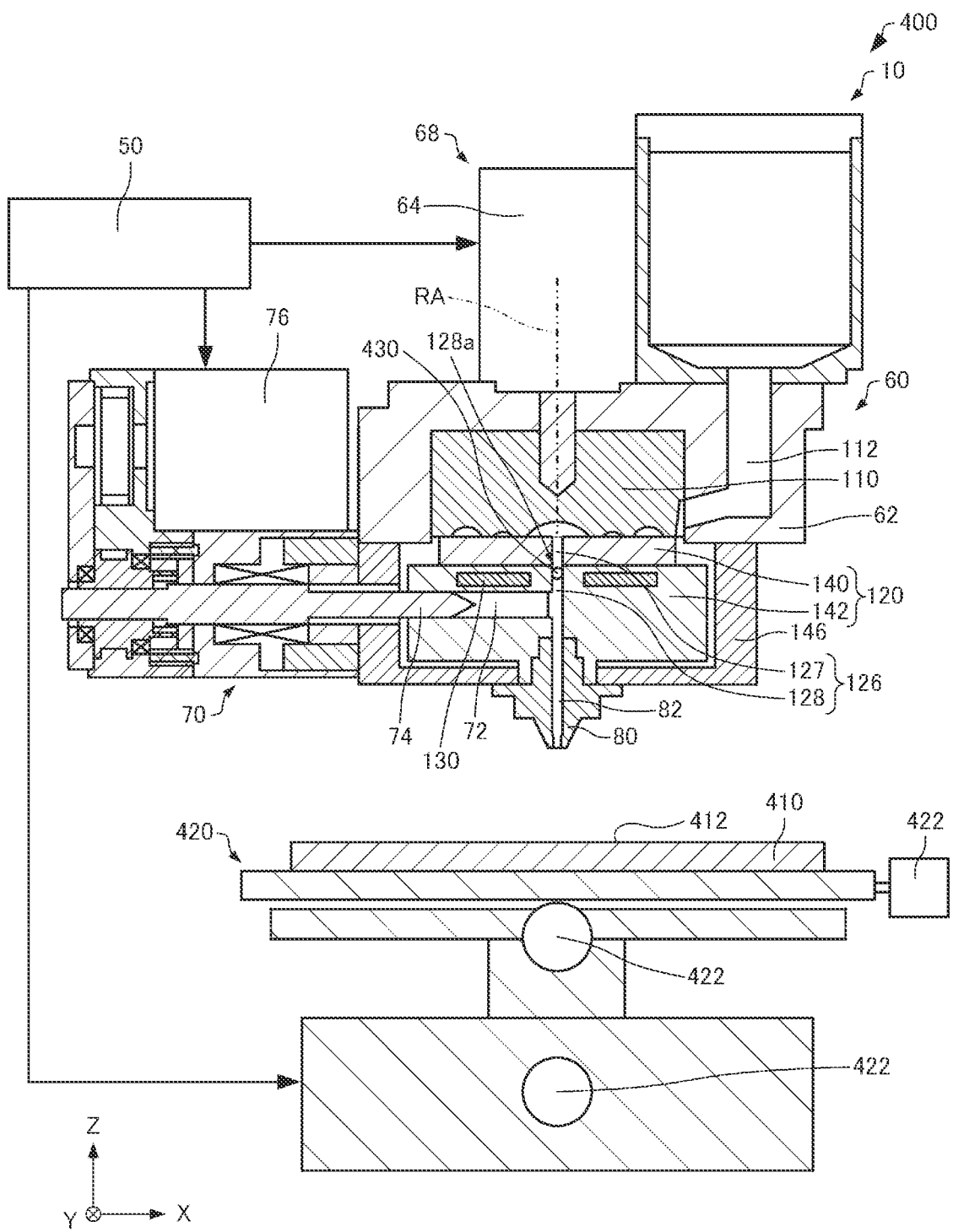
FIG. 12 is a cross-sectional view schematically illustrating a three-dimensional shaping device according to the present embodiment.

Next, a three-dimensional shaping device according to the present embodiment will be described with reference to the drawings. FIG. 12 is a cross-sectional view schematically illustrating a three-dimensional shaping device 400 according to the present embodiment.

For example, as illustrated in FIG. 12, the three-dimensional shaping device 400 includes the material supply unit 10, the control unit 50, the plasticizing device 60, the injection mechanism 70, the nozzle 80, a stage 410, and a moving mechanism 420. The plasticizing device 60 includes, for example, the screw unit 68, the barrel 120 including the first barrel 140 and the second barrel 142, the heating unit 130, and a butterfly valve 430.

The nozzle 80 discharges the plasticized material supplied from the plasticizing device 60 toward the stage 410. Specifically, the three-dimensional shaping device 400 drives the moving mechanism 420 to change a relative position between the nozzle 80 and the stage 410 while discharging the plasticized material from the nozzle 80 onto the stage 410. Accordingly, the three-dimensional shaping device 400 shapes a three-dimensional shaped object having a desired shape on the stage 410.

The stage 410 is moved by the moving mechanism 420. The three-dimensional shaped object is formed on a shaping surface 412 of the stage 410. The plasticized material may be directly laminated on the stage 410, or a sample plate may be provided on the stage 410 to form the three-dimensional shaped object on the sample plate.

The moving mechanism 420 changes the relative position between the nozzle 80 and the stage 410. In the illustrated example, the moving mechanism 420 moves the stage 410 with respect to the nozzle 80. The moving mechanism 420 is formed by, for example, a three-axis positioner that moves the stage 410 in the X-axis direction, the Y-axis direction, and the Z-axis direction by driving forces of three motors 422. The motors 422 are controlled by the control unit 50.

The moving mechanism 420 may be formed to move the nozzle 80 without moving the stage 410. Alternatively, the moving mechanism 420 may be formed to move both the nozzle 80 and the stage 410.

The butterfly valve 430 is provided in the communication hole 126. In the illustrated example, the butterfly valve 430 is provided at the end portion 128a of the second portion 128 of the communication hole 126 on the first portion 127 side. The butterfly valve 430 is open when it is in an ON state where the plasticized material is injected from the nozzle 80, and is closed when it is in an OFF state where the plasticized material is not injected from the nozzle 80. In the OFF state, the butterfly valve 430 is closed, and the plunger 74 is moved in the −X-axis direction to suction the plasticized material between the butterfly valve 430 and the nozzle 80. Accordingly, in the OFF state, the plasticized material between the butterfly valve 430 and the nozzle 80 can be prevented from coming out from the nozzle 80 due to gravity.

The embodiments and modifications described above are merely examples, and the present disclosure is not limited thereto. For example, each embodiment and each modification can be combined as appropriate.

The present disclosure includes a configuration substantially the same as the configuration described in the embodiment, for example, a configuration having the same function, method, and result, or a configuration having the same purpose and effect. The present disclosure includes a configuration obtained by replacing a non-essential portion of the configuration described in the embodiment. The present disclosure includes a configuration having the same function and effect as the configuration described in the embodiment, or a configuration capable of achieving the same object. The present disclosure includes a configuration in which a known technique is added to the configuration described in the embodiment.

The following contents are derived from the above-described embodiment.

One aspect of the plasticizing device includes: a drive motor; a flat screw having a groove forming surface in which a groove is formed, and rotating around a rotation axis of the drive motor; a barrel having a facing surface facing the groove forming surface and having a communication hole formed therein; and a heating unit configured to heat a material supplied between the flat screw and the barrel. The barrel has a separate structure including, when viewed from a direction orthogonal to the rotation axis, a first barrel having the facing surface, and a second barrel separated from the facing surface.

According to the plasticizing device, maintenance of the barrel can be easily executed.

According to one aspect of the plasticizing device, a screw case in which an opening portion for accommodating the flat screw is formed is provided, and a diameter of the first barrel may be smaller than a minimum length of the opening portion when viewed from a direction along the rotation axis.

According to the plasticizing device, the first barrel can be removed from the second barrel through the opening portion.

According to one aspect of the plasticizing device, the diameter of the first barrel may be smaller than the diameter of the flat screw when viewed from the direction along the rotation axis.

According to the plasticizing device, the first barrel can be removed from the second barrel through the opening portion.

According to one aspect of the plasticizing device, a check valve is provided in the communication hole, the communication hole includes: a first portion formed in the first barrel; and a second portion formed in the second barrel, and the check valve may be provided at an end portion of the second portion on the first portion side.

According to the plasticizing device, the check valve can be easily cleaned by separating the first barrel and the second barrel from each other.

According to one aspect of the plasticizing device, the check valve may be a flap valve that swings with a portion connected to an inner surface of the communication hole as a fulcrum.

According to the plasticizing device, even when a material having high flow resistance is used, a decrease in an injection amount can be prevented.

According to one aspect of the plasticizing device, the check valve may be a Tesla valve using a step provided on an inner surface of the communication hole.

According to the plasticizing device, even when a material having high flow resistance is used, a decrease in an injection amount can be prevented.

According to one aspect of the plasticizing device, the first barrel and the second barrel may be made of different materials.

According to the plasticizing device, for example, an inexpensive barrel can be provided while reducing wear of the facing surface.

According to one aspect of the plasticizing device, the heating unit may be provided in the second barrel.

According to the plasticizing device, when the first barrel is worn by the material to be supplied, even when the first barrel is replaced, the heating unit is not replaced, and thus the cost can be reduced.

One aspect of an injection molding device includes: a plasticizing device configured to plasticize a material into a plasticized material; and a nozzle configured to inject the plasticized material supplied from the plasticizing device toward a molding mold. The plasticizing device includes: a drive motor; a flat screw having a groove forming surface in which a groove is formed, the flat screw rotating around a rotation axis of the drive motor; a barrel having a facing surface facing the groove forming surface and having a communication hole formed therein; and a heating unit configured to heat a material supplied between the flat screw and the barrel. The barrel has a separate structure including, when viewed from a direction orthogonal to the rotation axis, a first barrel having the facing surface, and a second barrel separated from the facing surface.

One aspect of a three-dimensional shaping device includes: a plasticizing device configured to plasticize a material into a plasticized material; and a nozzle configured to discharge the plasticized material supplied from the plasticizing device toward a stage. The plasticizing device includes: a drive motor; a flat screw having a groove forming surface in which a groove is formed, the flat screw rotating around a rotation axis of the drive motor; a barrel having a facing surface facing the groove forming surface and having a communication hole formed therein; and a heating unit configured to heat a material supplied between the flat screw and the barrel. The barrel has a separate structure including, when viewed from a direction orthogonal to the rotation axis, a first barrel having the facing surface, and a second barrel separated from the facing surface.

What is claimed is:

1. A plasticizing device comprising:
   a first drive motor;
   a flat screw having a groove forming surface in which a first groove is formed, and rotating around a rotation axis by the first drive motor;
   a barrel having a facing surface facing the groove forming surface and having a communication hole formed therein;
   a barrel case housing the barrel, the barrel case having first and second openings outwardly opposite to each other along the rotation axis, the first opening being closer to the flat screw than the second opening; and
   a heater configured to heat a material supplied between the flat screw and the barrel, wherein
   the barrel has a separate structure including:
     a first barrel, the facing surface being formed at only the first barrel;
     a second barrel separated from the facing surface; and
     a screw joining between the first and second barrels, the screw extending along the rotation axis, a screw head of the screw being exposed on an outer surface of the second barrel,
   a first width of the first barrel along a first direction in a cross section is smaller than a second width of the second barrel along the first direction in the cross section, and the first direction is orthogonal to the rotation axis,
   a first area of the second barrel is larger than each of a second area of the first barrel and a third area of the flat screw in a plan view,
   an entirety of the first barrel is sandwiched between the flat screw and the second barrel along the rotation axis, the screw head is exposed via the second opening of the barrel case, and
the first barrel has a higher thermal conductivity than the second barrel.

2. The plasticizing device according to claim 1, further comprising:
a screw case in which an opening portion for accommodating the flat screw is formed, wherein
a diameter of the first barrel is smaller than a minimum length of the opening portion when viewed from a direction along the rotation axis.

3. The plasticizing device according to claim 2, wherein the diameter of the first barrel is smaller than a diameter of the flat screw when viewed from the direction along the rotation axis.

4. The plasticizing device according to claim 1, further comprising:
a check valve provided in the communication hole, wherein
the communication hole includes:
a first portion formed in the first barrel; and
a second portion formed in the second barrel, and
the check valve is provided at an end portion of the second portion on a side of the first portion.

5. The plasticizing device according to claim 4, wherein the check valve is a flap valve that swings with a portion connected to an inner surface of the communication hole as a fulcrum.

6. The plasticizing device according to claim 4, wherein the check valve is a Tesla valve using a step provided on an inner surface of the communication hole.

7. The plasticizing device according to claim 1, wherein the first barrel and the second barrel are made of different materials.

8. The plasticizing device according to claim 1, wherein the heater is provided in the second barrel.

9. An injection molding device comprising:
a plasticizing device configured to plasticize a material into a plasticized material; and
a nozzle configured to inject the plasticized material supplied from the plasticizing device toward a molding mold, wherein
the plasticizing device includes:
a drive motor;
a flat screw having a groove forming surface in which a groove is formed, and rotating around a rotation axis by the drive motor;
a barrel having a facing surface facing the groove forming surface and having a communication hole formed therein;
a barrel case housing the barrel, the barrel case having first and second openings outwardly opposite to each other along the rotation axis, the first opening being closer to the flat screw than the second opening; and
a heater configured to heat the material supplied between the flat screw and the barrel, wherein
the barrel has a separate structure including:
a first barrel, the facing surface being formed at only the first barrel;
a second barrel separated from the facing surface; and
a screw joining between the first and second barrels, the screw extending along the rotation axis, a screw head of the screw being exposed on an outer surface of the second barrel,
a first width of the first barrel along a first direction in a cross section is smaller than a second width of the second barrel along the first direction in the cross section, and the first direction is orthogonal to the rotation axis,
a first area of the second barrel is larger than each of a second area of the first barrel and a third area of the flat screw in a plan view,
an entirety of the first barrel is sandwiched between the flat screw and the second barrel along the rotation axis,
the screw head is exposed via the second opening of the barrel case, and
the first barrel has a higher thermal conductivity than the second barrel.

10. A three-dimensional shaping device comprising:
a plasticizing device configured to plasticize a material into a plasticized material; and
a nozzle configured to discharge the plasticized material supplied from the plasticizing device toward a stage, wherein
the plasticizing device includes:
a drive motor;
a flat screw having a groove forming surface in which a groove is formed, and rotating around a rotation axis by the drive motor;
a barrel having a facing surface facing the groove forming surface and having a communication hole formed therein;
a barrel case housing the barrel, the barrel case having first and second openings outwardly opposite to each other along the rotation axis, the first opening being closer to the flat screw than the second opening; and
a heater configured to heat the material supplied between the flat screw and the barrel, wherein
the barrel has a separate structure including:
a first barrel, the facing surface being formed at only the first barrel;
a second barrel separated from the facing surface; and
a screw joining between the first and second barrels, the screw extending along the rotation axis, a screw head of the screw being exposed on an outer surface of the second barrel,
a first width of the first barrel along a first direction in a cross section is smaller than a second width of the second barrel along the first direction in the cross section, and the first direction is orthogonal to the rotation axis,
a first area of the second barrel is larger than each of a second area of the first barrel and a third area of the flat screw in a plan view,
an entirety of the first barrel is sandwiched between the flat screw and the second barrel along the rotation axis,
the screw head is exposed via the second opening of the barrel case, and
the first barrel has a higher thermal conductivity than the second barrel.

11. The plasticizing device according to claim 1, further comprising:
a second motor, a cylinder communicating with the communication hole and provided in the second barrel, and
a plunger moving inside the cylinder by the second motor.

12. The plasticizing device according to claim 7, wherein a hardness of the first barrel is higher than a hardness of the second barrel.

13. The plasticizing device according to claim 1, wherein a second groove is formed in the facing surface of the first barrel, and the second groove is connected to the communication hole.

14. The plasticizing device according to claim 1, wherein a third width of the flat screw along the first direction in the cross section is larger than the first width and smaller than the second width.

15. The plasticizing device according to claim 1, wherein the second barrel is joined to the first barrel by the screw, the outer surface of the second barrel is outwardly opposite to the facing surface, and the second opening of the barrel case is formed at a position facing the outer surface of the second barrel to expose the screw head.

\* \* \* \* \*